UNITED STATES PATENT OFFICE.

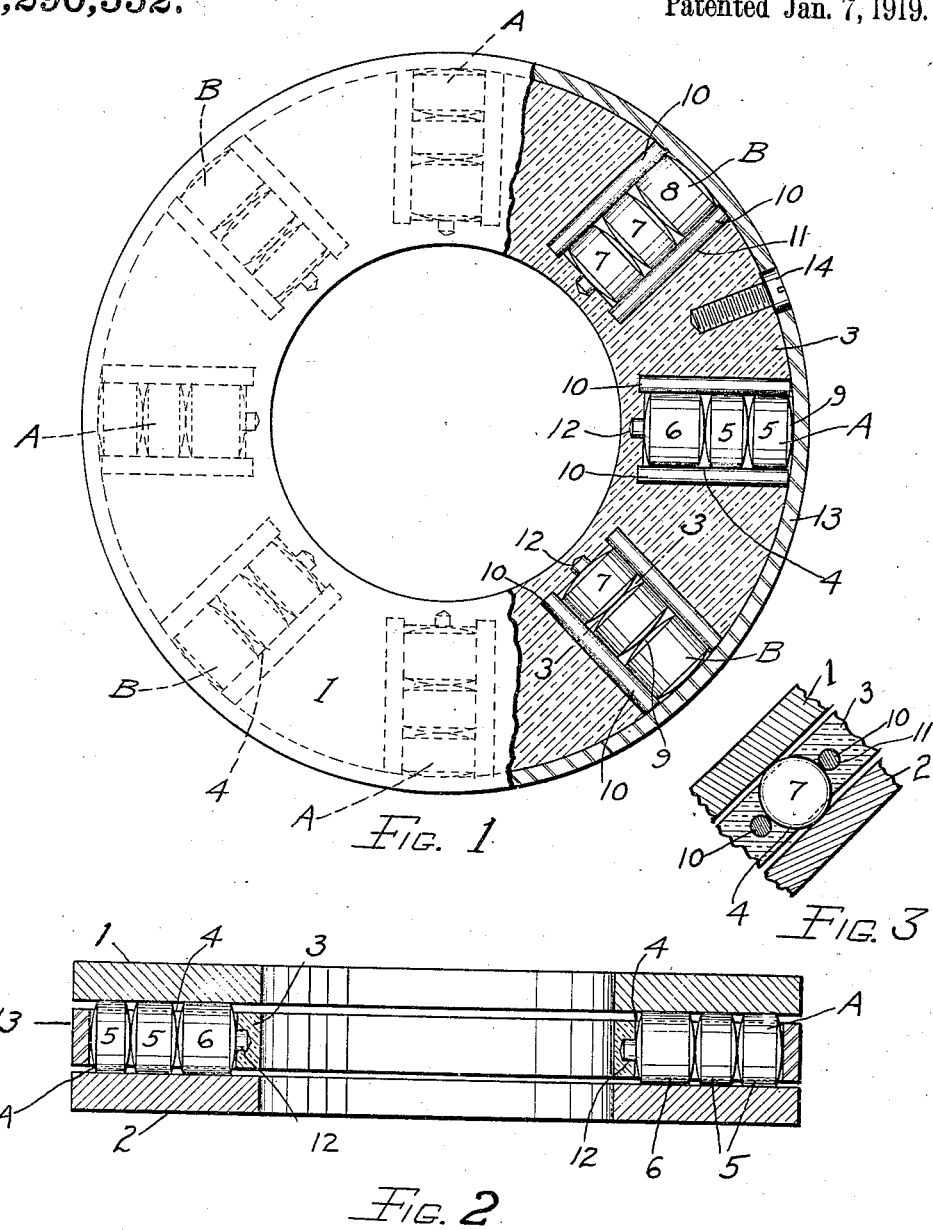

ORLANDO W. HART, OF FALL RIVER, MASSACHUSETTS.

ROLLER-BEARING.

1,290,552.   Specification of Letters Patent.   Patented Jan. 7, 1919.

Application filed December 20, 1917. Serial No. 208,117.

*To all whom it may concern:*

Be it known that I, ORLANDO W. HART, a citizen of the United States, and a resident of Fall River, county of Bristol, State of Massachusetts, have invented certain new and useful Improvements in Roller-Bearings, of which the following is a description.

My invention relates to roller bearings, and more particularly to anti-friction thrust bearings wherein bearing rollers or series of bearing rollers are arranged with their axes substantially radial to the axis of the bearing and are disposed between a pair of relatively rotatable members, such as a pair of annular hardened wearing plates, to transmit the thrust from one to the other of such plates and reduce the friction therebetween to a minimum.

In thrust bearings of the type described it is customary to employ cylindrical bearing rollers or thrust rollers and to maintain the rollers or series of rollers in proper position and properly spaced from each other by means of a cage or spacing member. This cage is usually in the form of an annular plate made of a comparatively soft material, such as brass, and provided with a plurality of radial cylindrical sockets or recesses extending inwardly from its periphery in which the rollers or series of rollers of the bearing are disposed and closely fit. The cage is slightly less in thickness than the diameter of the rollers and the latter therefore extend beyond the cage for engagement with the faces of the hardened plates between which the rollers and cage are disposed.

Much difficulty, however, has heretofore been experienced in bearings of the construction described above due to the wear of the side walls of the sockets of the cage or spacing member by the hardened rollers. This wear is due, in a large measure, to the difference in the diameter, and therefore in the length, of the annular tracking surface for the rollers on each of the opposed wearing plates which diameter increases uniformly from the inner to the outer edge of said tracking surface. This results in each roller having a decided tendency to assume a position in which its axis is tangential to the pitch line passing through its center. Accordingly, as the wear takes place, the rollers will skew and become more and more displaced from their proper radial positions with reference to the axis of the bearing, and will be dragged around on the hardened wearing plates between which they are disposed. The proper rolling movement of the rollers on the wearing plates is thus prevented and the rollers and plates soon become seriously damaged, and the efficiency and life of the bearing are greatly reduced. These defects are especially pronounced in bearings of this type wherein a plurality of radially arranged rollers are disposed in each of the sockets of the cage, for the rollers in each socket, when they become skewed or displaced from their proper radial position, will also wear and damage each other.

The principal object of my invention is to provide an improved anti-friction thrust bearing of the type described, wherein the above noted defects and objections will be eliminated and the life and efficiency of the bearing will be greatly increased.

Another object of my invention is to prevent wear of the bottom or inner walls of the sockets in which the rollers of this type of bearing are disposed. In practice, it has frequently been shown that a considerable amount of such wear takes place and is a detriment to the efficiency of the bearing and to its proper functioning in operation.

A further object of my invention is to provide an improved construction and arrangement for maintaining the parts of the bearing in proper position and for taking up outward thrusts imposed on the rollers.

Other objects and features of my invention will be hereinafter more fully described and claimed.

For a clearer understanding of my invention, attention is directed to the drawing accompanying and forming a part of this specification, and in which:

Figure 1 is a plan view, partly in section, of an anti-friction thrust bearing constructed in accordance with my invention;

Fig. 2 is a transverse cross-sectional view of the bearing shown in Fig. 1, parts being shown in elevation; and Fig. 3 is a sectional view taken on line 3—3 of Fig. 1.

Referring to the drawing, in the several views of which corresponding parts are designated by the same reference characters, 1 and 2 represent a pair of relatively rotatable members constituting parts of a thrust bearing, these members being shown as hardened annular plates. The annular plates 1 and 2 are prefereably of the same internal and external diameter and are concentrically arranged, the axes of these plates coinciding with the axis of the bearing. For the purpose of transmitting the thrust from one to the other of said plates 1 and 2, a plurality of series A and B, of preferably cylindrical rollers, are disposed therebetween, such series of rollers being arranged substantially radially with respect to the axis of the bearing and preferably being equispaced about such axis. In order to maintain the series of rollers properly spaced and properly positioned with respect to the axis of the bearing, a spacing member or cage 3 is employed. The cage 3 is made of comparatively soft metal, such as brass, and is preferably in the form of an annular plate having the same internal diameter as the plates 1 and 2, but being slightly less than the latter in external diameter. The cage or spacing member 3 is provided with a plurality of equal sized cylindrical radial sockets or recesses 4, extending inwardly from its periphery, in which the series of rollers A and B are respectively disposed and closely fit. As shown in Figs. 2 and 3, the spacing member or cage 3 has a thickness somewhat less than the diameter of the rollers of series A and B, the rollers therefore extending beyond the cage 3 for engagement with the hardened annular wearing plates 1 and 2. In order to prevent the formation of ridges and grooves on the bearing or roller tracking surfaces of the plates 1 and 2, the rollers in adjacent series are staggered; the outer rollers 5, 5 of each series A preferably being of the same width and the inner roller 6 of each series A preferably being considerably wider than either roller 5, and the inner rollers 7, 7 of each of the series B preferably being of the same width, equal to the width of the rollers 5, and the outer roller 8 of each series B preferably being wider than either roller 7, and equal to the width of rollers 6. For the purpose of reducing the friction at the ends of the rollers 5, 6, 7 and 8, the ends of such rollers are preferably formed spherically, as shown at 9.

In order to prevent wear of the walls of the sockets 4 by the rollers and to obviate the objections noted above which result from such wear, the soft metal cage 3 has applied thereto means of relatively hard material having portions substantially flush or coincident with walls of the sockets. This means preferably comprises cylindrical hardened pins 10 substantially embedded in plate 3 by being disposed in holes 11 drilled radially in the plate 3 adjacent the opposite side walls of each of the sockets 4. The holes 11 are preferably somewhat deeper than sockets 4 and are preferably of such size that the pins 10 have a driving fit therewith. The pins 10 are of the same length as the holes 11 and consequently when driven into the latter until their inner ends engage the bottom of said holes, their outer ends will be flush with the periphery of plate 3. Each pair of holes 11 is so located that the elements or portions of the pins 10 therein nearest the adjacent socket 4 are substantially flush or coincident with the respective side walls of the socket substantially midway of the width of such walls throughout the length of the socket. With this construction, any appreciable wear of the side walls will be prevented even when the bearing is subjected to extremely heavy duty for a long period, as the hardened pins are located at the points where greatest pressure is exerted on the side walls of the sockets by the bearing rollers. Consequently, skewing of the rollers will be prevented and they will be maintained in their proper tractive radial positions by the walls of the sockets 4.

Preferably, I also provide the plate or cage 3 with means of relatively hard material to prevent wear of the bottom walls of the sockets 4, which I find often occurs to a very appreciable degree in the type of bearing described herein. This means preferably consists of short hardened pins 12 substantially embedded in the plate or cage 3 and preferably extending radially of the bearing and axially of the sockets 4 respectively. The outer ends of the pins 12 are respectively substantially flush or coincident with the bottom walls of the sockets 4, and appreciable wear of said walls by inward thrusts imposed on the bearing rollers is consequently prevented.

To maintain the rollers and pins in assembled position in the cage or spacing member 3, I provide a hardened ring 13 which tightly embraces said cage. The ring 13 is forced into the position shown in Figs. 1 and 2, and then secured in such position as by one or more screws 14 extending therethrough and into the cage 3. The hardened ring 13 also takes up the outward thrust imposed on the rollers.

A thrust bearing of the construction described above is very efficient and is capable of operating at high speeds with a minimum of friction and wear. A bearing of this construction may also be readily and quickly disassembled and assembled for repair or other purposes.

It will be understood that my invention is not limited to the specific form described, but that such form is subject to various changes and modifications without departing from the spirit of the invention and the scope of the appended claims. For example, my invention is useful in bearings wherein single rollers are employed instead of series of rollers, and some features thereof are applicable to any bearing wherein one or more rollers are mounted in a cage.

Having now described my invention, what I claim as new and desire to protect by Letters Patent is as follows:—

1. A roller bearing comprising a plurality of rollers disposed substantially radially with respect to the axis of the bearing, a cage of comparatively soft material having radially extending cylindrical sockets in which said rollers are disposed, and a plurality of comparatively hard members applied to said cage and extending radially of the axis of the bearing, said members respectively having portions substantially flush with walls of said sockets.

2. A roller bearing comprising a plurality of rollers disposed substantially radially with respect to the axis of the bearing, a cage of comparatively soft material having radially extending cylindrical sockets in which said rollers are disposed, and a pair of hardened pins respectively embedded in said cage adjacent the opposite side walls of each of said sockets and having portions substantially flush with said walls respectively.

3. In an anti-friction thrust bearing bearing rollers arranged substantially radially of the axis of the bearing, a cage of comparatively soft material having sockets in which said rollers are respectively disposed, and means of comparatively hard material adjacent the bottom of each of said sockets and having portions substantially flush with but comprising only a part of the bottom walls of said sockets respectively.

4. In an anti-friction thrust bearing, bearing rollers arranged substantially radially of the axis of the bearing, a cage of comparatively soft material having sockets in which said rollers are respectively disposed, and radially extending pins of comparatively hard material embedded in said cage and respectively having their outer ends substantially flush with the bottom walls of said sockets.

5. In an anti-friction thrust bearing, a plurality of rollers arranged substantially radially of the axis of the bearing, a cage of comparatively soft material provided with sockets in which said rollers are respectively disposed, members of comparatively hard material disposed in recesses provided therefor in said cage, said recesses being so arranged that a portion of each of said members is substantially flush with a wall of one of said sockets, and a member of comparatively hard material embracing said cage and arranged to maintain said rollers and members in their sockets and recesses respectively.

6. In an anti-friction thrust bearing, a plurality of rollers arranged substantially radially of the axis of the bearing, a cage of comparatively soft material provided with sockets in which said rollers are respectively disposed, members of comparatively hard material disposed in radially extending recesses provided therefor in said cage, said recesses being so arranged that a portion of each of said members is substantially flush with a side wall of one of said sockets, a member of comparatively hard material embracing said cage and arranged to maintain said rollers and members in their sockets and recesses respectively, and means of comparatively hard material applied to said cage and having portions substantially flush with the bottoms of said sockets respectively.

7. A cage for roller bearings comprising a member of comparatively soft material having one or more cylindrical sockets for the reception of rollers, and means of comparatively hard material applied to said member for preventing wear of the side walls of said sockets.

8. A cage for roller bearings comprising an annular plate of comparatively soft material having one or more radially extending cylindrical sockets for the reception of rollers, and means of comparatively hard material applied to said plate and having portions substantially flush with but comprising only a part of the bottom walls of said sockets respectively for preventing wear of said walls.

9. A cage for roller bearings comprising an annular plate of comparatively soft material having one or more radially extending cylindrical sockets for the reception of rollers, and a pair of members of comparatively hard material respectively embedded in said plate adjacent the opposite side walls of each of said sockets and having portions substantially flush with said walls respectively.

This specification signed and witnessed this 18th day of December 1917.

ORLANDO W. HART.

Witnesses:
JESSIE E. STALKER,
JACOB UNGER.

Copies of this patent may be obtained for five cents each, by addressing the "Commissioner of Patents, Washington, D. C."